United States Patent [19]
Wideman et al.

[11] Patent Number: 5,698,620
[45] Date of Patent: Dec. 16, 1997

[54] ROSINATE ESTERS OF N-HYDROXYPHENYL MALEAMIC ACID

[75] Inventors: Lawson Gibson Wideman, Tallmadge; Raymond Benjamin Roennau, Stow; Denise Jeannette Keith, Akron, all of Ohio

[73] Assignee: The Goodyear Tire & Rubber Company, Akron, Ohio

[21] Appl. No.: 774,241

[22] Filed: Dec. 27, 1996

[51] Int. Cl.[6] .................................................. C08L 23/00
[52] U.S. Cl. ........................ 524/270; 524/274; 525/289
[58] Field of Search ...................... 524/270, 274; 525/289

[56] References Cited

U.S. PATENT DOCUMENTS

| | | | |
|---|---|---|---|
| 3,951,892 | 4/1976 | Drury, Jr. et al. | 260/23 EM |
| 5,614,576 | 3/1997 | Rutherford et al. | 524/270 |
| 5,618,883 | 4/1997 | Plamthottam et al. | 525/98 |

*Primary Examiner*—Edward J. Cain
*Attorney, Agent, or Firm*—Bruce J Hendricks

[57] ABSTRACT

The present invention relates to rosinate esters of N-hydroxyphenyl maleamic acid which are useful as a total or partial replacement for extender or processing oil in rubber formulations. Addition of these rosinate esters improve the modulus and tear of the vulcanizate. The rosinate esters of N-hydroxyphenyl maleamic acid are of the formula:

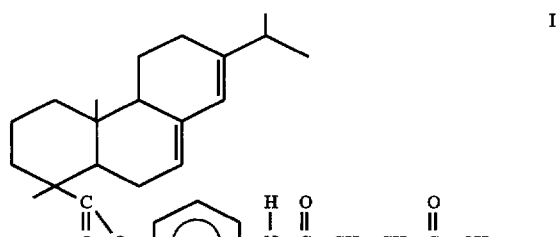

or

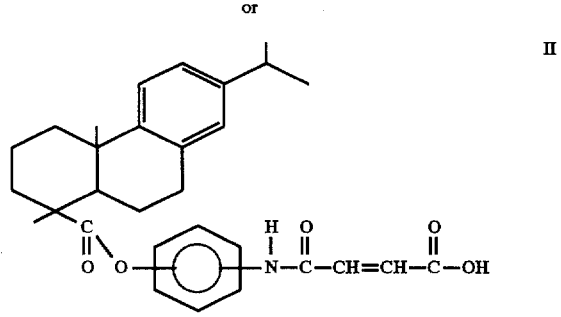

20 Claims, No Drawings

5,698,620

1

ROSINATE ESTERS OF N-HYDROXYPHENYL MALEAMIC ACID

BACKGROUND OF THE INVENTION

Both natural and synthetic elastomers usually require the use of processing aids to assist mechanical breakdown and compounding. Materials such as mixtures of oil soluble sulfonic acids of high molecular weight with a high boiling alcohol, paraffin oils, blends of sulfonated petroleum products and selected mineral oils are conventionally used as processing aids. Additional examples include petroleum, paraffinic and vegetable oils, coal tar, petroleum residues or pitches and naturally occurring or synthetic resins.

One advantage in using processing aids is they assist the incorporation of fillers and other ingredients with low power consumption since they reduce internal friction in calendering and extrusion. By reducing the amount of friction during compounding, the temperature of the rubber will remain lower and thus minimize the possibility of scorch.

Various types of rosin acids have been used as extenders for high molecular weight SBR. See *Properties of GR-S Extended With Rosin Type Acids*, L. H. Howland, J. A. Reynolds, and R. L. Provost, Industrial and Engineering Chemistry, Vol. 45, No. 5, May 1953. Whereas reasonably good cured physical properties can be obtained with the rosin type acids, there are problems associated with their use which include cure retardation, high tack and poor low temperature performance, which limit their use as an extender in rubber formulations.

U.S. Pat. No. 4,491,655 discloses the use of methyl esters of rosin acid as total or partial replacement for oil in a rubber formulation. Compared with the use of aromatic extending oils in rubbers, methyl esters of rosin acids provide comparable processing and low temperature performance and superior abrasion resistance. Unfortunately, use of methyl esters of rosin acid does not benefit the vulcanizate properties related to rebound and tear. These properties are typically improved by the supplemental addition of a multitude of additives. The cost of compounding all these additives as well as the potential detrimental interaction of these additives is preferably avoided.

U.S. Pat. No. 5,021,493 discloses the use of sulfur curable rubber compounds containing a 2,5-diorganohydroquinone. Unfortunately, use of a diorganohydroquinone does not provide a significant improvement in compound modulus and tear. Diorganohydroquinone must also be used at low levels (0.5–5 phr) since it affects cure rate by causing a rubber compound to become scorchy or having the tendency to premature cure.

U.S. Pat. No. 4,433,114 discloses a diene rubber containing 4-hydroxyphenyl maleamic acid.

EP 0 476 310 A2 discloses rubber compositions containing a hydroxy aryl substituted maleamic acid. The hydroxy-aryl substituted maleamic acid may be used as a replacement for resorcinol in rubber compositions and function as a methylene acceptor for reaction with conventional methylene donors.

U.S. Pat. Nos. 5,444,109 and 5,504,127 relate to monoesters of rosin acid and their use in rubber.

SUMMARY OF THE INVENTION

The present invention relates to rosinate esters of N-hydroxyphenyl maleamic acid. Use of the rosinate esters of N-hydroxyphenyl maleamic acid in a rubber vulcanizate improves the modulus and tear in the vulcanizate.

DETAILED DESCRIPTION OF THE INVENTION

There is disclosed a rosinate ester of N-hydroxyphenyl maleamic acid of the formula:

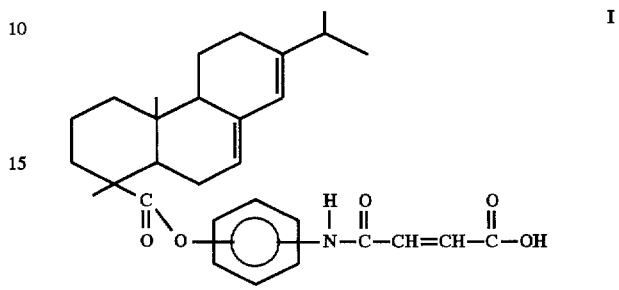

I or

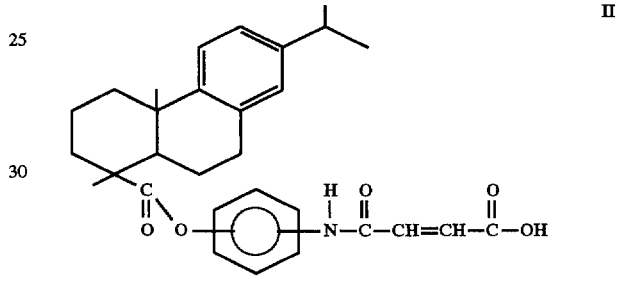

II

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and the above rosinate ester of N-hydroxyphenyl maleamic acid.

In accordance with the above formulas, the rosinate esters of N-hydroxyphenyl maleamic acid include those of the formula

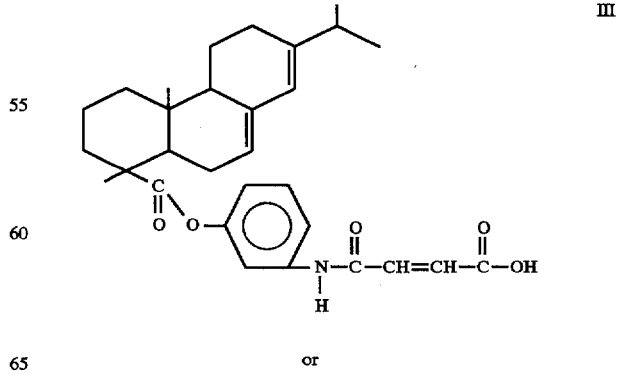

III or

-continued

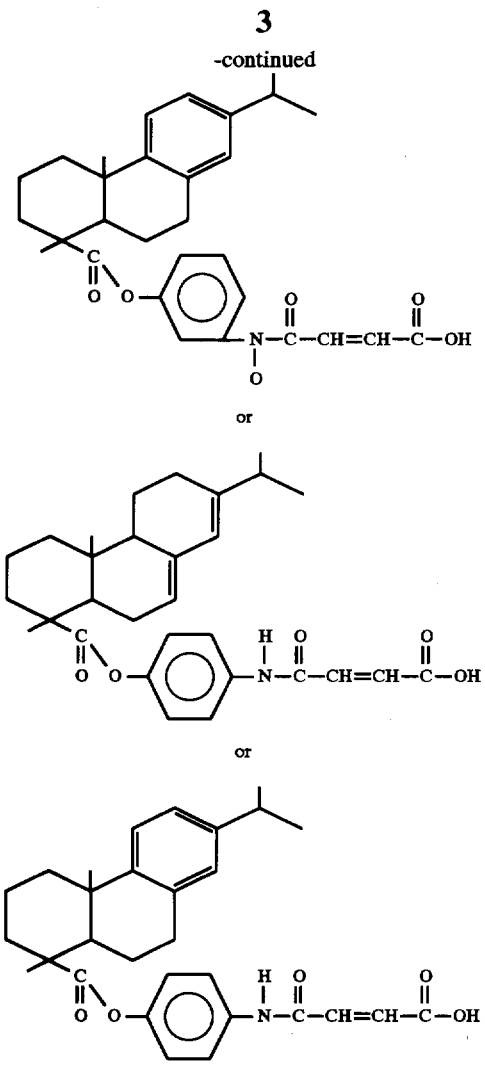

Preferably, the rosinate esters are of the structural formulae V and VI.

Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex™ rosin.

Rosins derived from both oleoresin and aged stump wood are composed of approximately 90 percent resin acids and 10 percent nonacidic components. Chemical treatment of rosins, such as hydrogenation, dehydrogenation, or polymerization are known which produce modified resins.

Rosin acids are monocarboxylic acids having the typical molecular formula, $C_{20}H_{30}O_2$. Examples of the resin acids are abietic, levopimaric, neoabietic, palustric, dehydroabietic, tetrahydroabietic, pimaric, isopimaric, Δ-isopimaric, elliotinoic and sandaracopimaric. Over the years nomenclature of individual acids has changed. IUPAC nomenclature names resin acids as derivatives of abietane. The two major rosin acid components are abietic acid having the following structural formula:

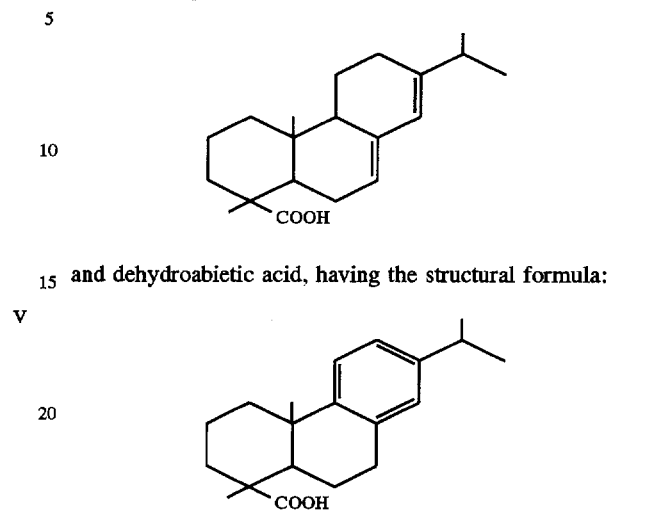

and dehydroabietic acid, having the structural formula:

The acid number for the rosin acid may vary. Generally the acid number ranges from about 160 to about 175. Preferably the acid number is below 170 with a range of from about 165 to about 168 being particularly preferred.

The rosin acid or acids are reacted with an N-hydroxyphenyl maleamic acid under esterification conditions. Representative examples of such acids are N-(3-hydroxyphenyl) maleamic acid and N-(4-hydroxyphenyl) maleamic acid. Preferably, N-(4-hydroxyphenyl) maleamic acid is used. When N-(3-hydroxyphenyl) maleamic acid is used, the rosinate esters of formulae III and IV are formed. When N-(4-hydroxyphenyl) maleamic acid is used, the rosinate esters of formulae V and VI are formed.

The mole ratio of the rosin acid to the N-hydroxyphenyl maleamic acid may vary. Generally, the mole ratio of rosin acid to N-hydroxyphenyl maleamic acid will range from about 0.5 to about 1.5. Preferably the mole ratio of rosin acid to N-hydroxyphenyl maleamic acid is from about 0.6 to about 1.0.

The rosin acid or acids are reacted with the N-hydroxyphenyl maleamic acid under esterification conditions to form the rosinate esters of N-hydroxyphenyl maleamic acid. In addition to the N-hydroxyphenyl maleamic acid esters of abietic acid and dehydroabietic acid, there may be present the esters derived from the N-hydroxyphenyl maleamic acid and any of the following acids: levopimaric, neoabietic, palustric, tetrahydroabietic, pimaric, isopimaric, Δ-isopimaric, elliotinoic and sandaracopimaric.

An organic solvent may be used to dissolve the rosin acid, to increase heat transfer and to facilitate water removal through a reflux trap. The solvent is preferably inert to the esterification reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, sulfolane, and the like. Mixtures of the aforementioned solvents may be employed so long as they are compatible with each other under the conditions of the reaction and will adequately dissolve the rosin acid and not interfere with the esterification reaction.

The esterification reaction may be conducted in the presence of a catalyst to speed up the reaction. Examples of catalysts that may be used include condensation catalysts, e.g., dibutyltin oxide or butyl stannic acid. In addition acid catalysts may be used such as sulfuric acid, hydrochloric acid and toluenesulfonic acid. The amount of catalyst that is used will vary depending on the particular catalyst that is selected. For example, when an acid catalyst is used, from about 5 weight percent to about 10 weight percent is recommended.

The esterification reaction may be conducted over a variety of temperature ranges. The temperatures may range from moderate to an elevated temperature. In general, the esterification reaction may be conducted at a temperature ranging from about 100° C. to about 250° C. The preferred temperature range is from about 110° C. to about 200° C., while the most preferred temperature range is from about 120° C. to about 190° C.

The esterification reaction may be conducted over a variety of pressures. Preferably the reaction is conducted at a pressure range of from about 0 to about 100 psig.

The esterification reaction is conducted for a period of time sufficient to produce the desired monoester of rosin acid. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, if any, reaction pressure, concentration and choice of solvent, and other factors.

The esterification reaction may be carried out in a batch, semi-continuous or continuous manner. The esterification reaction may be conducted in a single reaction zone or in a plurality of reaction zones, in series or in parallel. The reaction may be conducted intermittently or continuously. The reaction may be conducted in a vessel equipped with a thermometer, stirrer and a distillation column to separate water that distills from reactants and optionally a Dean Stark trap. The reactor may be fitted with internal and/or external heat exchangers to control temperature fluctuations. Preferably, an agitation means is available to ensure a uniform reaction. Mixing induced by vibration, shaker, stirrer, rotating, oscillation, etc. are all illustrative of the types of agitation means which are contemplated for use in the esterification reaction. Such agitation means are available and well known to those skilled in the art.

Aside from functioning as a processing oil, addition of the rosinate esters of N-hydroxyphenyl maleamic acid to sulfur vulcanizable elastomers enhances many physical properties of the vulcanizate. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber; vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the present invention are natural rubber, polybutadiene, SBR and polyisoprene.

For the purposes of the present invention, the rosinate esters of N-hydroxyphenyl maleamic acid may be used as a methylene acceptor. The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reactant that contributes the moiety that later forms into the methylene bridge is the methylene donor wherein the other reactant is the methylene acceptor.

For purposes of the present invention, the term "sulfur vulcanized rubber" is used herein to describe the vulcanized reaction product of the above rubbers described for use in the sulfur vulcanizable elastomers or rubbers.

The vulcanizable rubber compositions of the present invention may contain a methylene donor. The term "methylene donor" is intended to mean a compound capable of reacting with the rosin ester of N-hydroxyphenyl maleamic acid ester of rosin acid and generate the resin in-situ.

Examples of methylene donors which are suitable for use in the present invention include hexamethylene tetramine, hexaethoxymethylmelamine, hexamethoxymethylmelamine, lauryloxymethylpyridinium chloride, ethoxymethylpyridinium chloride, trioxan hexamethoxymethylmelamine, the hydroxyl groups of which may be esterified or partly esterified, and polymers of formaldehyde such as paraformaldehyde. In addition, the methylene donors may be N-substituted oxymethylmelamines, of the general formula:

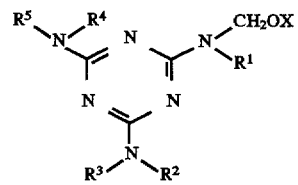

wherein X is an alkyl having from 1 to 8 carbon atoms, $R^1$, $R^2$, $R^3$, $R^4$ and $R^5$ are individually selected from hydrogen, an alkyl having from 1 to 8 carbon atoms, the group —$CH_2OX$ or their condensation products. Specific methylene donors include hexakis(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The weight ratio of methylene donor to the rosinate ester of N-hydroxyphenyl maleamic acid may vary. Generally speaking, the weight ratio will range from about 1:10 to about 10:1. Preferably, the weight ratio ranges from about 1:3 to 3:1.

The methylene donor may be present in an amount ranging from about 0.5 to about 10 phr. Preferably, the methylene donor will be present in an amount ranging from about 0.5 to 5 phr.

The rosinate esters of N-hydroxyphenyl maleamic acid may be used in a wide variety of proportions in the rubber and may be a substitute, in whole or part for conventional extender or process oils. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of the rosinate ester of N-hydroxyphenyl maleamic acid that may be added to the rubber may range from about 2 phr (parts by weight per hundred parts by weight of rubber) to about 50 phr. Preferably the amount of rosinate esters of N-hydroxyphenyl maleamic acid that is added ranges from about 5 phr to about 35 phr.

In addition to the rosinate esters of N-hydroxyphenyl maleamic acid, the rubber stock may containing conventional additives including fillers, pigments, zinc oxide, stearic acid, accelerators, sulfur vulcanizing agents, stabilizers, antidegradants, tackifiers, plasticizers, waxes, prevulcanization inhibitors, and the like. Representative of suitable fillers include carbon black, silica, titanium dioxide and clay which are typically added in amounts ranging from about 25 to about 125 phr depending on the application of the stock. Representative of conventional accelerators are amines, guanidines, thioureas, thiazoles, thiurams, sulfenamides, dithiocarbamates and xanthates which are typically added in amounts from about 0.2 to 5 phr. Representative of sulfur vulcanizing agents include elemental sulfur (free sulfur), or sulfur donating vulcanizing agents, for example, dithiocarbamate, polymeric polysulfide or sulfur olefin adducts. The amount of the sulfur vulcanizing agent will vary depending upon the type of rubber and particular type of sulfur vulcanizing agent but generally from about 0.1 phr to about 5 phr with a range of from about 0.5 to about 2 being preferred. Representative of the antidegradants which may be used in the rubber stock include monophenols, bisphenols, thiobisphenols, polyphenols, hydroquinone derivatives, phosphites, phosphate blends, thioesters, naphthylamines, diphenylamines as well as other diarylamine derivatives, para-phenylene diamines, quinolines and blended amines. Antidegradants are generally used in an amount ranging from about 0.10 phr to about 10 phr.

The sulfur-vulcanizable rubber compound is sulfur-cured at a rubber temperature ranging from about 125° C. to 180° C. Preferably, the temperature ranges from about 135° C. to 160° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. Incorporation of the rosinate ester of N-hydroxyphenyl maleamic acid into the sulfur-vulcanizable rubber may be accomplished by conventional means of mixing such as by the use of a Banbury™ or Brabender™.

The above-described rosinate esters of N-hydroxyphenyl maleamic acid may be added in a non-productive stage or productive stage. Preferably, such esters are added in a non-productive stage.

The rubber composition of this invention can be used for various purposes. For example, the rubber compounds may be in the form of a tire, hose, belt, motor mount, rubber bushing, power belt, printing roll, shoe sole, shoe heel, floor tile, caster wheel, seal, gasket, conveyor belt, wringer, battery case, floor mat, mud flap, ball mill liner and the like. Preferably, the rubber compound is used for various tire compounds. Such pneumatic tires can be built, shaped, molded and cured by various methods which are known and will be readily apparent to those having skill in such art. Preferably, the rubber composition is used in the wire coat, bead coat, ply coat and/or tread. As can be appreciated, the tire may be a passenger tire, aircraft tire, truck tire, earthmover, agricultural and the like.

Cure properties were determined using a Monsanto oscillating disc rheometer which was operated at a temperature of 150° C. and at a frequency of 11 Hertz. A description of oscillating disc rheometers can be found in the Vanderbilt Rubber Handbook edited by Robert O. Babbit (Norwalk, Conn., R. T. Vanderbilt Company, Inc., 1978), pages 583–591. The use of this cure meter and standardized values read from the curve are specified in ASTMD-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stock that is being tested is required to oscillate the rotor at the vulcanization temperature. The values obtained using this cure test are very significant since changes in the rubber or the compounding recipe are very readily detected. It is obvious that it is normally advantageous to have a fast cure rate.

The values for 60° C. E' Storage Modulus and 60° E" Loss Modulus result from measuring the dynamic mechanical properties of cured rubber in tension at 60° C. The results are the viscoelastic response of a test sample to a tensile deformation at a fixed strain and a frequency of 11 Hertz at 60° C. Measurements are E' and E".

The equipment used are a Rheovibron viscoelastometer, purchased from Imass, Inc, Box 134, Accord (Hingham), Mass. 02018 and includes the following: rheovibron dynamic viscoelastometer (model Rheo-200), oscilloscope (model V-422/V-222), potentiometer, temperature bath at 60° C. and Fortuna (model NAF-470R) purchased from Hudson Machinery Corp, Box 321, Haverhill, Mass. 01830. The Fortuna is a 457 mm (18 inch) band-knife splitter with a special lubrication device, variable speed motor and special finger guard. Also need is a (2) position 0.254×2.54 cm (0.1×1.0 inch) specimen die and electronic digital calipers or equivalent.

The test samples are prepared from a cured laboratory test sheet. The test piece is ran through the Fortuna splitter until the test sample, having a uniform thickness of 0.046 to 0.065 cm (0.018 to 0.025 inch), is obtained. Using the specimen die, die out two test specimens having a width of 0.254 cm and a length of 2.54 cm, from the test sample. The test sample is gauged for thickness using the electronic calipers set in millimeters. This gauge is recorded, along with sample width (see 4.2), on the Rheovibron work sheet.

Some of the following tables report cure properties that were determined from cure curves that were obtained for the various rubber formulations that were prepared. These properties include the minutes to 90 percent of the torque increase (t90 min).

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during curing and subsequent testing.

The following examples are presented in order to illustrate but not limit the present invention.

EXAMPLE 1

Preparation of the Rosinate Ester of N-Hydroxphenyl Maleamic Acid derived from Rosin Acid and N-(4-hydroxyphenyl) Maleamic Acid Three hundred grams (1.0 mole) of tall oil rosin acid and 207 grams (1.0 mole) of N-(4-hydroxyphenyl) maleamic acid were added to 22 grams of toluenesulfonic acid in 260 ml of xylene and charged into a 2-liter three-necked, round-bottom flask fitted with a thermocouple, Dean-Stark trap, stirrer and nitrogen balloon. After 4 hours of reflux at a pot temperature of about 155°–170° C., 1 mole of water was collected. The reaction product was stripped of volatiles at 29 inches of Hg vacuum.

The product was an amber solid with a melting point of 95° C. Infrared analysis showed reduction of the acid carbonyl function and appearance of the ester carbonyl function at 1735 $cm^{-1}$. GPC scans also show ester formation with smaller amounts of apparent dimers and trimers. Mass Spectometry shows molecular ions corresponding to the molecular weight range of the N-(hydroxyphenyl) maleamic acid ester of rosin acid.

EXAMPLE 2

Physical Testing

Table II below shows the basic rubber compounds that were used in this example. The rubber compounds were prepared in a three-staged Banbury mix. All parts and percentages are by weight unless otherwise noted.

The various samples were prepared using the respective amount (phr) of the ingredients listed in Table I. Table II lists the physical data for each sample. The cure times and temperatures appear alongside each measured property.

TABLE I

|  | Control A | Control B | C | D | E | F |
|---|---|---|---|---|---|---|
| 1st Non-Productive |  |  |  |  |  |  |
| Natural Rubber (#2 ribbed smoked sheet) | 100.0 | 100.0 | 100.0 | 100 | 100 | 100 |
| SAF Carbon Black | 15.0 | 15.0 | 15.0 | 15.0 | 15.0 | 15.0 |
| 2nd Non-Productive |  |  |  |  |  |  |
| SAF Carbon Black | 35.0 | 35.0 | 35.0 | 35.0 | 35.0 | 35.0 |
| Processing Oil | 5.0 | 5.0 | 5.0 | 5.0 | 5.0 | 5.0 |
| Stearic Acid | 1.0 | 1.0 | 1.0 | 1.0 | 1.0 | 1.0 |
| Zinc Oxide | 5.0 | 5.0 | 5.0 | 5.0 | 5.0 | 5.0 |
| Antioxidant | 2.0 | 2.0 | 2.0 | 2.0 | 2.0 | 2.0 |
| Rosinate Ester of Example 1 | 0 | 0 | 0.50 | 1.0 | 1.5 | 2.0 |
| Productive |  |  |  |  |  |  |
| Sulfur, Accelerator, Retarder | 3.1 | 3.1 | 3.1 | 3.1 | 3.1 | 3.1 |
| Hexamethoxymethyl melamine | 1.5 | 0 | 1.5 | 1.5 | 1.5 | 1.5 |

TABLE II

| Samples | Control A | Control B | C | D | E | F |
|---|---|---|---|---|---|---|
| Hexamethoxymethyl melamine (phr) | 1.5 | 0 | 1.5 | 1.5 | 1.5 | 1.5 |
| Rosinate Ester of Example 1 (phr) | 0 | 0 | 0.5 | 1.0 | 1.5 | 2.0 |
| Delta S/State of Cure (165° C.) dNm | 26.5 | 27.3 | 26.3 | 25.8 | 25.6 | 25.3 |
| Reversion @ 1 hr ODR 165° C.) dNm | −2.3 | −3.7 | −2.0 | −1.7 | −1.5 | −1.3 |
| 300% Modulus (36 min/150° C.) MPa | 10.0 | 10.8 | 9.71 | 9.47 | 9.04 | 9.09 |

TABLE II-continued

| Samples | Control A | Control B | C | D | E | F |
|---|---|---|---|---|---|---|
| Shore A Hardness | | | | | | |
| (36 min/150° C.) | 64 | 63 | 64 | 65 | 65 | 67 |
| (40 min/165° C.) | 61 | 61 | 64 | 64 | 64 | 66 |
| 60° C. E' Storage Modulus | | | | | | |
| (36 min/150° C.) | 2.324 | 2.248 | 2.378 | 2.581 | 2.994 | 2.850 |
| (40 min/165° C.) | 2.214 | 2.212 | 2.441 | 2.573 | 2.341 | 2.631 |
| 60° E" Loss Modulus | | | | | | |
| (36 min/150° C.) | .270 | .267 | .273 | .373 | .356 | .328 |
| (40 min/165° C.) | .274 | .312 | .295 | .314 | .295 | .339 |
| Peel Adhesion to Itself @ 95° C. (Newtons) | | | | | | |
| (46 min/150° C.) | 137 | 111 | 136 | 143 | 146 | 199 |
| (50 min/165° C.) | 151 | 114 | 156 | 146 | 153 | 167 |
| Instron Tear (45 min/165° C.) | 465 | 415 | 475 | 470 | 515 | 465 |

Increased compound levels of rosinate ester of Example 1 give increased values for the Storage Modulus (E') and Loss Modulus (E") over the controls A and B. Increased values for E' and E" indicate that increased resin formation has occurred within the compounded and cured rubber and that improved handling and traction is expected in tires made from such compounds. The increased Shore A Hardness over the controls also indicates that increased resin formation has occurred when the level of rosinate ester of Example 1 is increased. Increased compound peel adhesion with the higher levels of rosinate ester will tend to give improved tear properties in tires, which leads to increased tire durability and tire life.

The lower compound reversion for higher levels of rosinate ester indicate that high temperature exposures of a tire lead to less rubber degradation and tend to increase tire life.

What is claimed is:

1. A process for preparing rubber compositions which comprises admixing a rubber selected from the group consisting of natural rubber, homopolymers of conjugated diolefins, copolymers of conjugated diolefins and ethylenically unsaturated monomers or mixtures thereof with a rosinate ester of N-hydroxyphenyl maleamic acid of the formula:

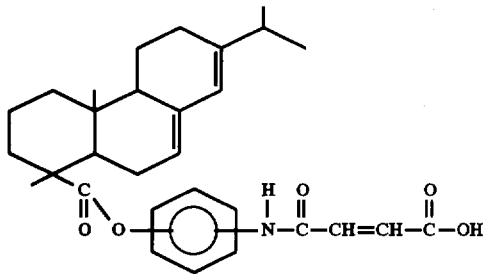

I or

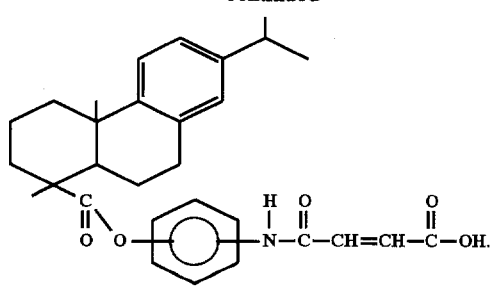

II

2. The process of claim 1 wherein rosinate ester of N-hydroxyphenyl maleamic acid is of the formula:

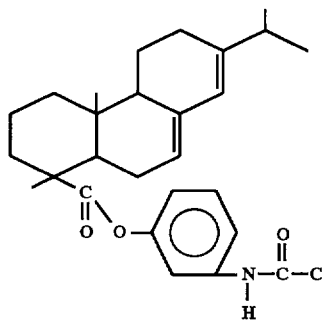

III or

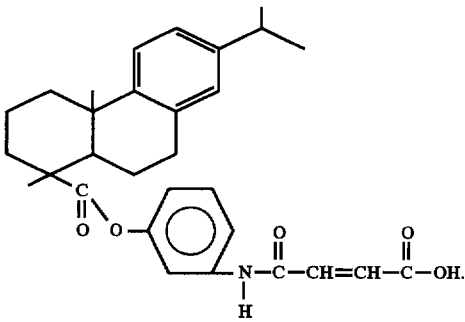

IV

3. The process of claim 1 wherein said rosinate ester of N-hydroxyphenyl maleamic acid is of the formula:

V

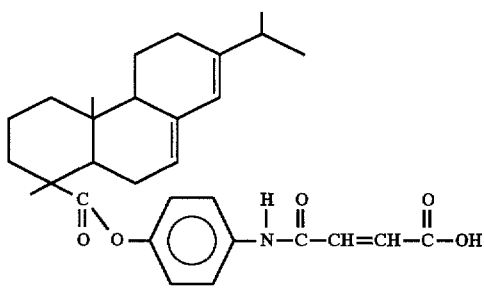

or

VI

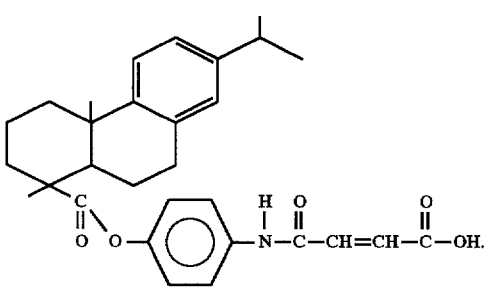

4. The process of claim 1 wherein said rosinate ester of N-hydroxyphenyl maleamic acid is at a concentration of from about 2 parts by weight per one hundred parts by weight rubber to 50 parts by weight per one hundred parts by weight rubber.

5. The process of claim 1 wherein said rosinate ester of N-hydroxyphenyl maleamic acid is added to a rubber selected from the group consisting of natural rubber, polybutadiene, styrene-butadiene rubber, polyisoprene or mixtures thereof.

6. The process of claim 1 wherein said rosinate ester of N-hydroxyphenyl maleamic acid is at a concentration of from about 5 parts by weight per one hundred parts by weight rubber to 35 parts by weight per one hundred parts by weight rubber.

7. A rubber composition which comprises (1) a rubber selected from the group consisting of natural rubber, homopolymers of conjugated diolefins and copolymers of conjugated diolefins, ethylenically unsaturated monomers or mixtures thereof and (2) a rosinate ester of N-hydroxyphenyl maleamic acid of the formula:

I

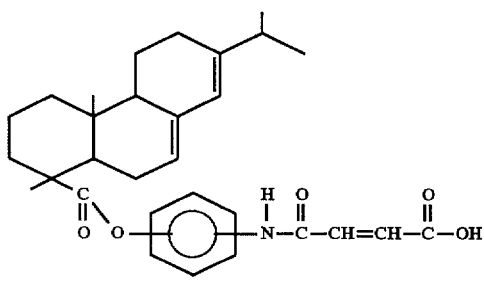

or

8. The rubber composition of claim 7 wherein said rosinate ester of N-hydroxyphenyl maleamic acid is of the formula

II

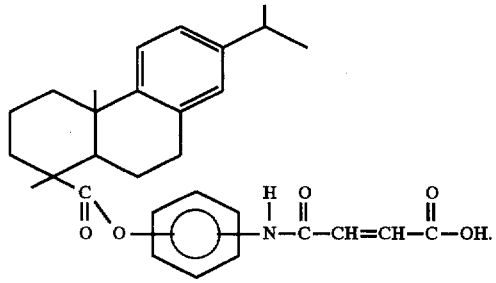

III

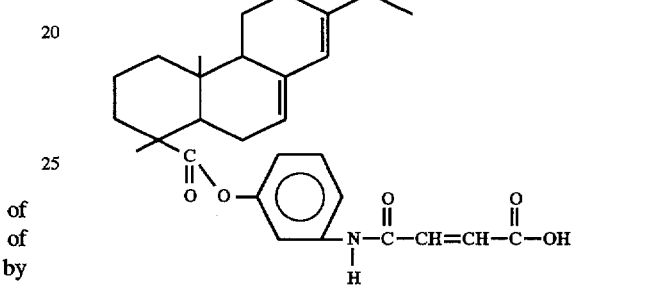

or

IV

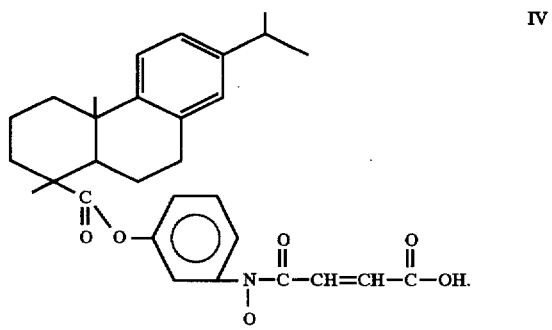

9. The rubber composition of claim 7 wherein said rosinate ester of N-hydroxyphenyl maleamic acid is of the formula

V

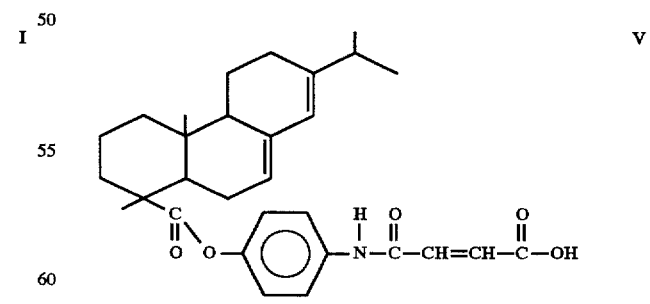

or

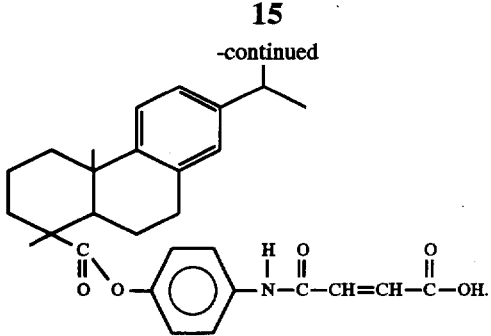

10. The rubber composition of claim 7 wherein said rosinate ester of N-hydroxyphenyl maleamic acid is at a concentration of from about 2 parts by weight per one hundred parts by weight rubber to 50 parts by weight per one hundred parts by weight rubber.

11. The rubber composition of claim 7 wherein said rosinate ester of N-hydroxyphenyl maleamic acid is added to a rubber selected from the group consisting of natural rubber, polybutadiene, styrene-butadiene rubber, polyisoprene or mixtures thereof.

12. The rubber composition of claim 10 wherein said rosinate ester of N-hydroxyphenyl maleamic acid is at a concentration of from about 5 parts by weight per one hundred parts by weight of rubber to 35 parts by weight per one hundred parts by weight of rubber.

13. The rubber composition of claim 7 additionally containing from 0.5 to 10 phr of a methylene donor.

14. The rubber composition of claim 13 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

15. The rubber composition according to claim 13 wherein the methylene donor is selected from the general formula:

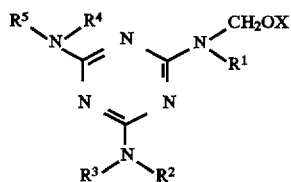

VI wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms, the group —$CH_2OX$ or their condensation products.

16. The rubber composition of claim 13 wherein the methylene donor is selected from the group consisting of hexakis-(methoxymethyl)melamine, N,N',N"-trimethyl/N, N',N"-trimethylolmelamine, hexamethylolmelamine, N,N', N"-dimethylolmelamine, N-methylolmelamine, N,N'-dimethylolmelamine, N,N',N"-tris(methoxymethyl) melamine and N,N'N"-tributyl-N,N',N"-trimethylolmelamine.

17. The rubber composition of claim 13 wherein the weight ratio of methylene donor to the rosinate ester of N-hydroxyphenyl maleamic acid may range from about 1:10 to about 10:1.

18. The rubber composition of claim 7 in the form of a tire, hose, belt, motor mount, rubber bushing, power belt, printing roll, shoe sole, shoe heel, floor tile, caster wheel, seal, gasket, conveyor belt, wringer, battery case, floor mat, mud flap and ball mill liner.

19. The rubber composition of claim 18 in the form of a tire.

20. The rubber composition of claim 19 wherein said composition is used in the wire coat, bead coat, ply coat or tread.

* * * * *

UNITED STATES PATENT AND TRADEMARK OFFICE
CERTIFICATE OF CORRECTION

PATENT NO. : 5,698,620
DATED : December 16, 1997
INVENTOR(S) : Lawson Gibson Wideman et al It is certified that error appears in the above-indentified patent and that said Letters Patent is hereby corrected as shown below:

In Column 3, line 14, delete "O" and insert therefor --H--, to read the same as Formula IV in Column 12, line 64.

In Column 14, line 45, delete "O" and insert therefor --H--, to read the same as Formula IV in Column 12, line 64.

Signed and Sealed this

Thirty-first Day of March, 1998

Attest:

BRUCE LEHMAN

Attesting Officer

Commissioner of Patents and Trademarks